United States Patent [19]

van Oeveren et al.

[11] Patent Number: 5,425,929

[45] Date of Patent: Jun. 20, 1995

[54] METHOD OF RECOVERING SUBSTANTIALLY PURE CO₂ FROM FERMENTATION GAS

[76] Inventors: Pieter W. van Oeveren, Valkenburgerlaan 9, Heemstede, Netherlands, 2103 AK; Karel R. J. Jansen, Pinksterbloem 4, Alphen a/d Rijn, Netherlands, 2403 VL

[21] Appl. No.: 50,147

[22] PCT Filed: Oct. 24, 1991

[86] PCT No.: PCT/NL91/00213

§ 371 Date: May 10, 1993

§ 102(e) Date: May 10, 1993

[87] PCT Pub. No.: WO92/07933

PCT Pub. Date: May 14, 1992

[30] Foreign Application Priority Data

Oct. 24, 1990 [NL] Netherlands ............... 9002322

[51] Int. Cl.⁶ .................. C01B 17/00; C01B 31/20
[52] U.S. Cl. ................. 423/243.01; 423/245.2; 423/437 R
[58] Field of Search .......... 423/437, 245.2, 243.01

[56] References Cited

U.S. PATENT DOCUMENTS

| | | | |
|---|---|---|---|
| 1,302,549 | 5/1919 | Heuser | 423/437 |
| 1,519,932 | 12/1924 | Reich | 423/437 |
| 1,942,485 | 1/1934 | Metzger | 423/437 |
| 1,968,899 | 8/1934 | Nathan | 423/437 |
| 4,551,325 | 11/1985 | Alesandrini et al. | 423/659 |

FOREIGN PATENT DOCUMENTS

12165  5/1914  United Kingdom.

OTHER PUBLICATIONS

John H. Perry, *Chemical Engineers' Handbook*, Fourth Edition (1972), McGraw-Hill Book Co., pp. 18-25, 18-26.

Patent Abstracts of Japan-vol. 6, No. 131 (C-114) (1009)-Jul. 17, 1982.

*Primary Examiner*—Wayne Langel

[57] ABSTRACT

A method of recovering substantially pure CO₂ from a fermentation gas polluted with organic compounds and with sulphur compounds comprising the steps of:

(a) washing the gas with water or an aqueous solution in a scrubber with a packed bed until the washed gas contains no more than 2.5 ppm organic impurities;

(b) oxidizing the oxidizable impurities so as to provide a gas having a level of purity such that when said gas is bubbled through mineral water there are no noticeable smell or taste deviations;

(c) removing the major part of the water; and (d) drying the CO₂ to the desired water content.

20 Claims, 1 Drawing Sheet

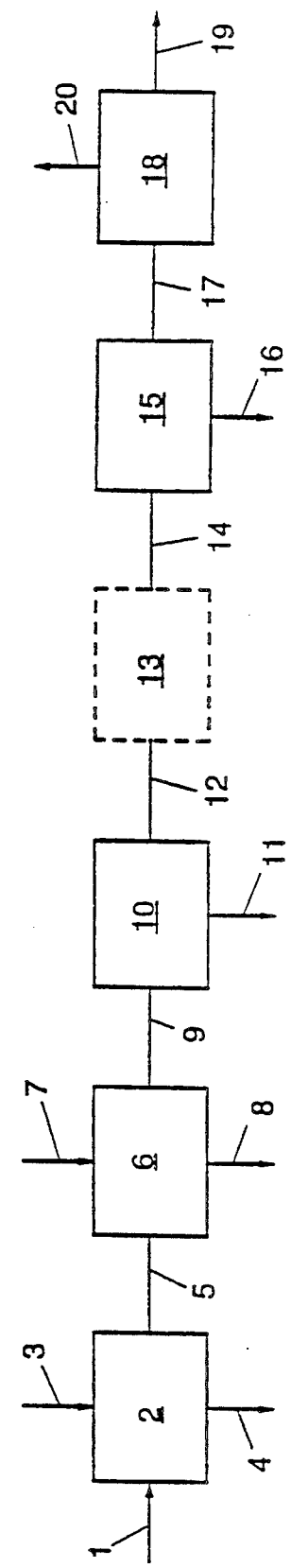

METHOD OF RECOVERING SUBSTANTIALLY PURE CO₂ FROM FERMENTATION GAS

This invention relates to a method of recovering substantially pure $CO_2$ from a fermentation gas polluted with organic compounds and with sulphur compounds.

In various processes, gas streams are obtained which contain substantial amounts of $CO_2$. In particular when brewing beer, fermenting grapes, and in distilleries, large amounts of $CO_2$-containing gas are developed which is polluted with organic compounds and with sulphur compounds. The value of this gas, however, is considerable because it is obtained by a natural process and can be properly applied in the beverage industry, e.g. for making carbonated soft drinks or beer.

Since the gas also contains substantial amounts of impurities in the form of organic compounds such as ethanol, and sulphur compounds such as $H_2S$ and DMS (dimethyl sulphide), it is necessary to purify the gas before it is used. The gas also contains non-condensable gases such as oxygen and nitrogen, which gases must also be removed at least partially.

The presence of the sulphur compounds in the gas gives an unpleasant smell and/or taste, e.g. in mineral water if this is provided with unpurified or insufficiently purified $CO_2$.

Up to the present this fermentation gas has been purified nearly exclusively by washing with water, compression, and cooling to remove the major part of the water, removing the organic and sulphur impurities by adsorption at an activated carbon filter, further drying the gas and condensating the $CO_2$ to reduce the content of non-condensable gases.

U.S. Pat. No. 4,699,642 discloses a method of preparing substantially pure, liquid $CO_2$ for use in the beer brewing process. According to this patent, purification is also effected by adsorption.

This system has the drawback that the risk of a breakthrough of impurities is rather great. In practice, it has also been found that additional measures must be taken regularly to avoid this risk. A breakthrough of impurities is not desirable because of the smell and/or taste problems when $CO_2$ is used in beverages.

The object of this invention is to provide a method of recovering substantially pure $CO_2$ from a fermentation gas polluted with organic compounds and with sulphur compounds.

According to the invention this method comprises washing the gas with water or an aqueous solution under such conditions that the gas contains no more than 2.5, preferably no more than 1.25 ppm organic impurities, oxidizing the oxidizable impurities, removing the major part of the water, and drying the $CO_2$ to the desired water content.

Surprisingly, it has been found that this simple method gives a purified $CO_2$ having a content of sulphur-containing impurities of not more than 2 ppb calculated as $H_2S$.

The amounts of organic impurities and sulphur impurities have been calculated on the basis of parts by volume per volume.

Crucial points of the method according to the invention are, inter alia, the very thorough washing of the gas, followed by the oxidation with an aqueous solution of an oxidator. As compared with the known methods based on the adsorption of the impurities at activated carbon, the method according to the invention is very simple. Since no adsorption stage is present, the method can be carried out continuously with fewer appliances in a simpler process.

Surprisingly, it is possible to eliminate the concentrations of impurities, very low as they are, by oxidation, despite a low dosage of active chlorine of $0.5 \times 10^{-4}$ to $3.0 \times 10^{-4}$ wt. % in the solution. In the method according to the invention it has also been found that substantially no trihalomethane and/or ethyl acetate is formed, as can be expected of a combination of wet washing and oxidation with chlorine compounds.

BRIEF DESCRIPTION OF DRAWING

The accompanying FIGURE diagrammatically shows an installation for carrying out the method according to the invention.

Gas streams that can be purified according to the invention are, inter alia, the $CO_2$-containing gas streams from the brewing of beer, fermentation of grapes and other fruits, preparation of distilled beverages and the like. In general, the invention is applicable to all gas streams from a fermentation, i.e. it is also possible to thus purify gas from sewage works. Such gas streams consist for the greater part of $CO_2$, water vapour, non-condensable gases such as oxygen and nitrogen, and for the rest of the above organic and sulphur impurities.

The $CO_2$ content of the gas streams to be treated will generally be at least 80 vol. %, in particular more than 95, or more than 99 vol. %.

The gas is preferably washed in a scrubber provided with a packed bed on the basis of a loose packing or of a structured packing. Preferred is a structured packing because this enables the height and, consequently, the volume of the packed bed to be considerably reduced.

The removal efficiency of the organic impurities obtained in the scrubber is more than 99.5%, preferably more than 99.9%. This is sufficient to meet the requirement of a content of impurities of not more than 1.0 ppm, preferably not more than 0.5 ppm, in particular about 0.1 ppm.

In case of inadequate removal of the organic impurities, ethyl acetate and other undesirable compounds are formed. Especially the formation of ethyl acetate is not desired when the gas is used for beverages such as soft drinks.

After washing, the gas stream will preferably consist of at least 80 vol. %, preferably more than 95 vol. %, in particular more than 99 vol. % $CO_2$. For the rest, the gas stream consists of the above organic and sulphur impurities, water vapour and non-condensable gases. Non-condensable gases as referred to herein are gases that do not condense upon liquefaction of $CO_2$. Examples thereof are oxygen and nitrogen.

The purified gas is then fed into an oxidation column. This column may also be a packed bed or another system in which an intensive gas-liquid contact is obtained. In this oxidation the sulphur compounds are removed in a substantial degree, e.g. to a content of less than 5 ppb, i.e. to a content below the smell and taste limit. The oxidation can be carried out with any suitable aqueous solution of an oxidator. Preferably, however, potassium permanganate or sodium hypochlorite is used because they give the best results. Particularly preferred is sodium hypochlorite because it is easily used, gives little pollution and involves few operational problems.

After the oxidation, the $CO_2$ mainly contains water and non-condensable gases. First of all, the major part of the water is removed, after which the gas is dried. In theory, this might be done in a single stage, but in practice this is done in two stages. Preferably, the gas is first compressed and cooled, whereby a large part of the water present condenses out. Subsequently, the remaining water is substantially removed by applying a conventional drying process.

If desired, any breakthrough of impurities can be avoided by incorporating a police filter in the system, such as an impregnated or a non-impregnated activated carbon filter. This filter is suitably placed before the gas drying stage.

The purified and dried gas is finally liquefied. This, too, can be done in a conventional manner. The content of non-condensable gases is then also reduced. There is thus obtained a very pure, liquid $CO_2$ which meets the requirements imposed with respect to its suitability for use in the food and beverage industry.

It is to be observed that the suitability of $CO_2$ is determined by bubbling $CO_2$ through mineral water and determining the smell and taste thereof by means of a panel test. The $CO_2$ is suitable if there are no noticeable smell and taste deviations.

The invention will now be illustrated with reference to the accompanying FIGURE which diagrammatically shows an installation for carrying out the method according to the invention.

Via line 1 a fermentation gas, e.g. from a brewery, is fed into a wash column 2 at a pressure ranging from 0.5 to 5 bar and a temperature ranging from 15° to 50° C., which wash column is provided with a packing for obtaining a good gas/liquid contact. The washing liquid is supplied via line 3 and discharged via line 4. The gas stream from which the major part of the organic impurities is removed is supplied via line 5 to oxidation tower 6. Via line 7 a solution of an oxidizing agent is supplied to this oxidation tower 6, while via line 8 the oxidized sulphur compounds are discharged. The oxidation tower can be filled with a packing material for promoting the gas/liquid contact.

The purified gas stream is supplied via line 9 to a compression/cooling unit 10 in which the pressure of the gas is increased to a value ranging from 15 to 25 bar, and the temperature of the gas is adjusted to a value ranging from 10° to 30° C. The major part of the moisture thereby condenses and is discharged via line 11.

The gas is discharged from unit 10 via line 12 and supplied to police filter 13. This filter need not be present. The filter is filled with a material adsorbent to sulphur compounds for protection against a possible breakthrough of these compounds from the oxidation tower. Subsequently, the gas is supplied via line 14 to drier 15 in which the gas is dried to the desired water content. The water is discharged via line 16. The dried gas is finally supplied via line 17 to unit 18 for liquefaction thereof. There is thus obtained, on the one hand, liquid $CO_2$, which is passed to a storage or transfer tank, not shown, and, on the other hand, non-condensable gases such as oxygen and nitrogen, which are discharged via line 20.

EXAMPLE

Into an installation as shown in the FIGURE a gas stream of 280 m³/h and having a temperature of 20° C. was supplied to wash column 2, which was provided with a Sulzer Mellapak packing. Supplied via line 3 were 150 l/h wash water. The gas leaving the wash column had a content of organic impurities of 0.25 ppm, a $CO_2$ content of 99.8 vol. %, and contained for the rest non-condensable gases and sulphur impurities. This gas was then supplied to the oxidation tower filled with a Sulzer BX packing. Supplied to the tower were 800 l/h of a solution of $2 \times 10^{-4}$ wt. % active chlorine in water. After leaving the tower the gas had a content of sulphur compounds of about 2 ppb, and the gas was free from smell and taste when bubbling through mineral water.

Subsequently, the gas was compressed to a pressure of 19 bar and cooled to a temperature of 20° C. The major part of the water present in the gas thereby condensed. The gas was then dried to a water content of 4 ppm. The gas thus dried was finally liquefied at a temperature of 23° C. and a pressure of 18 bar.

We claim:

1. A method of recovering substantially pure $CO_2$ from a fermentation gas polluted with organic compounds and with sulphur compounds, which comprises the steps of:
   (A) washing the gas with water or an aqueous solution until the washed gas reaches a first preselected level of purity, said first preselected level of purity being such that the washed gas (1) contains no more than 2.5 ppm organic impurities and (2) is capable of being purified to a second preselected level of purity by oxidation in a packed bed oxidation column using an aqueous solution of potassium permanganate, said second preselected level of purity being such that when the gas is bubbled through mineral water there are no noticeable smell or taste deviations;
   (B) oxidizing the oxidizable impurities so as to provide a gas having said second preselected level of purity;
   (C) removing the major part of the water; and
   (D) drying the $CO_2$ to the desired water content, said dry $CO_2$ being such that when said dry $CO_2$ is bubbled through mineral water there are no noticeable smell or taste deviations.

2. A method as claimed in claim 1, wherein the oxidation of the oxidizable impurities is carried out using an aqueous solution of an oxidator in a packed bed.

3. A method as claimed in claim 2, wherein the oxidator is potassium permanganate or sodium hypochlorite.

4. A method as claimed in claim 1, wherein at least one of the washing and oxidation steps is carried out in a scrubber provided with a structured packing.

5. A method as claimed in claim 1, wherein the removal of the major part of the water is carried out by compression and cooling of the gas.

6. A method as claimed in claim 1, wherein the dried $CO_2$ is liquefied remove the non-condensable gases.

7. A method as claimed in claim 1, wherein after removal of the major part of the water the gas is passed through an activated carbon filter.

8. A method as claimed in claim 1, wherein after washing the gas has a $CO_2$ content of at least 80 vol. %.

9. A method as claimed in claim 1, wherein the gas is washed in a scrubber with a packed bed.

10. A method as claimed in claim 1, wherein the gas is washed until the washed gas contains no more than 1.25 ppm organic impurities.

11. A method as claimed in claim 8, wherein after washing the gas has a $CO_2$ content of at least 99 vol. %.

12. A method of recovering substantially pure $CO_2$ from a fermentation gas polluted with organic compounds and with sulphur compounds, said substantially pure $CO_2$ being such that when said substantially pure $CO_2$ is bubbled through mineral water there are no noticeable smell or taste deviations, said method consisting essentially of the following steps:

(a) washing the gas with water or an aqueous solution in a scrubber with a packed bed until the washed gas contains no more than 2.5 ppm organic impurities;

(b) oxidizing the oxidizable impurities so as to provide a gas having a level of purity such that when said gas is bubbled through mineral water there are no noticeable smell or taste deviations;

(c) removing the major part of the water; and (d) drying the $CO_2$ to the desired water content.

13. The method of claim 12, said method further consisting essentially of the following step: after removal of the major part of the water, passing the gas through an activated carbon filter.

14. The method of claim 12, said method further consisting essentially of the following step: after drying the $CO_2$, liquefying the $CO_2$ and removing the non-condensable gases.

15. The method of claim 12, wherein the oxidation of the oxidizable impurities is carried out using an aqueous solution of an oxidator in a packed bed.

16. The method of claim 15, wherein the oxidator is potassium permanganate or sodium hypochlorite.

17. The method of claim 12, wherein the removal of the major part of the water is carried out by compression and cooling of the gas.

18. The method of claim 12, wherein after washing the gas has a $CO_2$ content of at least 80 vol. %.

19. The method of claim 12, wherein the gas is washed until the washed gas contains no more than 1.25 ppm organic impurities.

20. The method of claim 18, wherein after washing the gas has a $CO_2$ content of at least 99 vol. %.

* * * * *

UNITED STATES PATENT AND TRADEMARK OFFICE
CERTIFICATE OF CORRECTION

PATENT NO. : 5,425,929
DATED : June 20, 1995
INVENTOR(S) : Pieter W. van Oeveren, et al.

It is certified that error appears in the above-indentified patent and that said Letters Patent is hereby corrected as shown below:

On title page, add item [73]
the following line --Assignee: Heineken Technical Services B.V., Amsterdam, Netherlands--.

On title page, before the Abstract, please add the following line --Attorney, Agent, or Firm--Pearne, Gordon, McCoy & Granger--.

Column 4, line 42, delete "2" and add --1--.

Column 4, line 51, after "liquefied" add --to--.

Signed and Sealed this

Twenty-third Day of July, 1996

*Attest:*

BRUCE LEHMAN

*Attesting Officer*     *Commissioner of Patents and Trademarks*